April 18, 1967     T. W. SNOW     3,314,640
SHOE SOLE MOLDS

Filed Feb. 18, 1965     2 Sheets-Sheet 1

Inventor
Thomas W. Snow
By his Attorney
Scott A. Foster

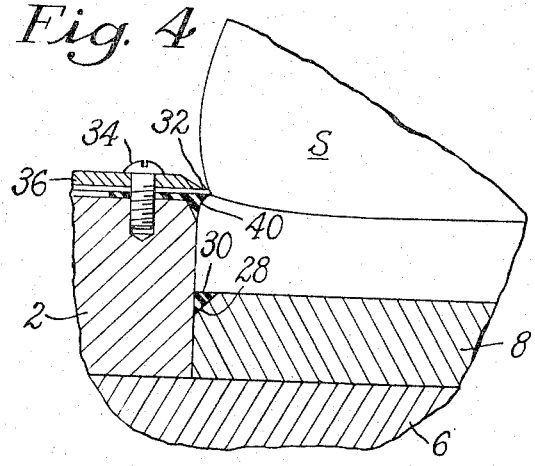
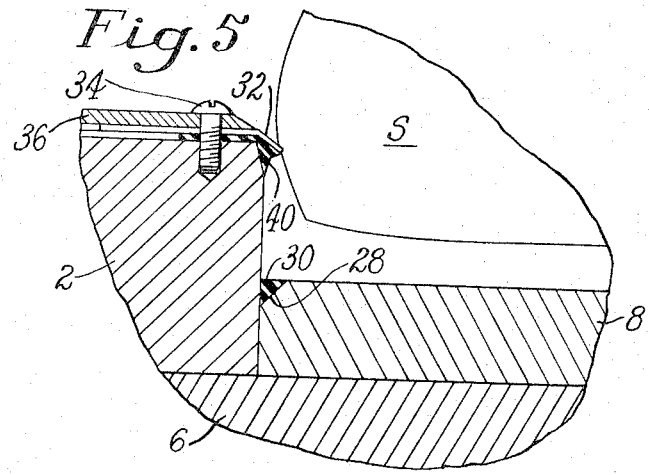

United States Patent Office 3,314,640
Patented Apr. 18, 1967

3,314,640
SHOE SOLE MOLDS
Thomas W. Snow, Melrose, Mass., assignor to United Shoe Machinery Corporation, Flemington, N.J., and Boston, Mass., a corporation of New Jersey
Filed Feb. 18, 1965, Ser. No. 433,589
7 Claims. (Cl. 249—83)

This invention relates to molding devices and is herein illustrated in its application to machines for molding and attaching sole and heel units to the bottoms of lasted footwear. A machine of this type is disclosed, for example, in United States patent application Ser. No. 388,070, filed Aug. 7, 1964, upon application of L. C. Battell et al. While the invention is herein illustrated in its application to machines for molding and attaching sole and heel units to the bottoms of lasted footwear, it is to be understood that the invention is not limited in scope to machines of this type but in certain aspects is applicable generally to molding devices.

The patent application above referred to discloses a machine designed for the production of shoes having sole and heel units molded in situ thereon. Most commonly, such machines are used for the injection molding of plastic sole and heel units. When the molding material is plastic, problems relating to leakage of the molding material from the mold cavity during a molding operation are usually not critical. However, such machines may be adapted for injecting fluid rubber into the mold cavities for the forming of rubber sole and heel units on lasted uppers. Because of the differences in viscosity between the fluid plastic and fluid rubber, the same behavior pattern is not followed by the fluid rubber. The rubber more readily tends to flow between the bottom mold member and the side mold members, forming "flash." The fluid rubber also tends to flow between the welt plate and the upper, forming "spew" upon the upper. The spew gives the shoe an unsightly appearance and the flash necessitates a flash removing operation. Occasionally, the same problems are present in the use of less viscous plastic material.

Accordingly, it is an object of the present invention to provide an improved mold assembly for the injection molding of rubber or plastic sole and heel units onto shoe uppers. It is also an object of the present invention to provide such an assembly which will produce a molded unit free from flash. It is a further object of the present invention to provide such as assembly which will produce a sole and heel unit on a shoe upper without the occurrence of spew.

With the above and other objects in view, as will hereinafter appear, the present invention in one aspect therefore contemplates the provision in an injection sole molding assembly of a bottom mold member being cut away along its margin to provide a base, and an endless gasket adhered to the base and arranged to be engaged by the side mold members as they come to the limits of their mold closing movement.

In accordance with a further feature of the invention, a bite plate is attached to each side mold member which lies in contiguous relation to a lasted shoe and is arranged to afford a closure for the cavity provided by the bottom mold member and the side mold members. The side mold members are characterized by a sealing member which acts along the line of contact of the bite plate with the shoe to prevent outflow of fluid from the mold cavity between the bite plate and the shoe.

These and other features of the invention will now be described with reference to the accompanying drawings and pointed out in the appended claims.

In the drawings:

FIGS. 4 and 5 are elevational views taken in section along the center line of the mold assembly and showing an upper in position for a molding operation.

Figure 1:
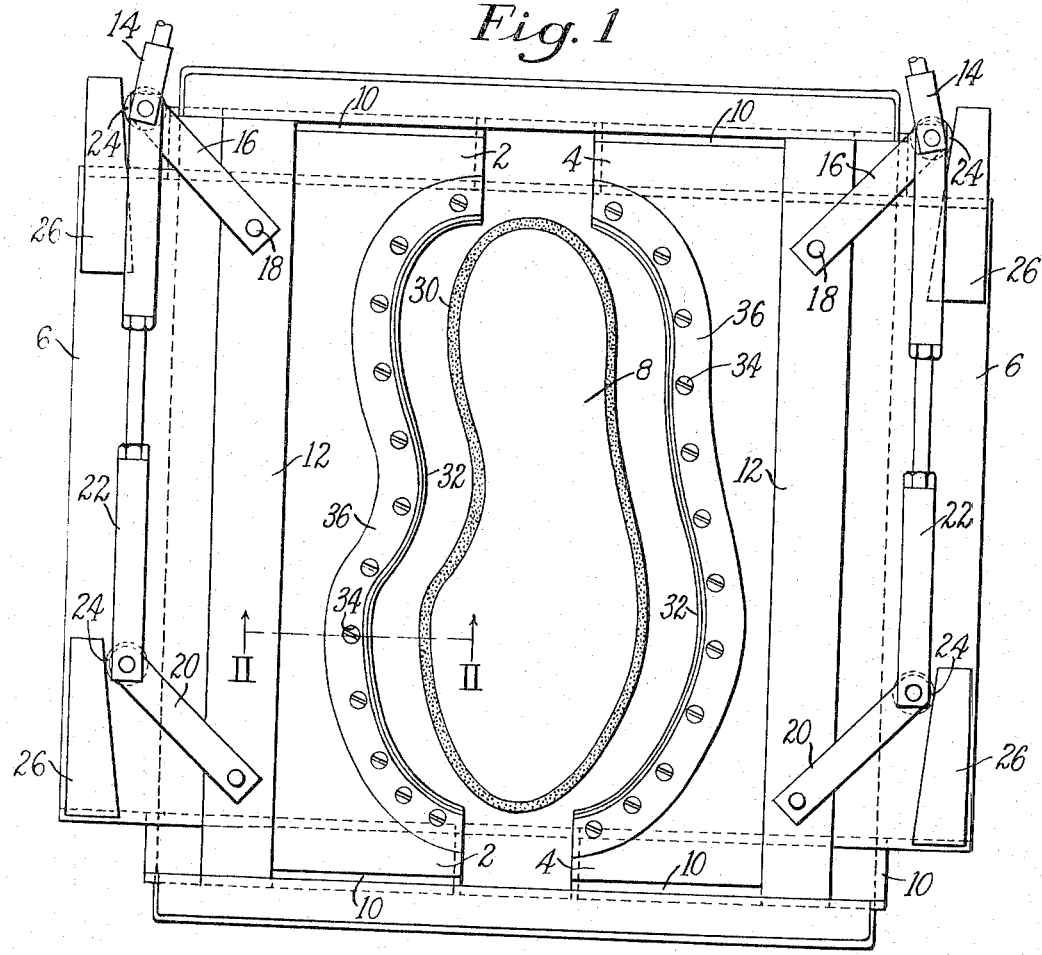
FIG. 1 is a plan view illustrating features of the mold assembly.

Referring to FIG. 1, there is illustrated a sole molding assembly, less footform, which includes side mold members 2 and 4 mounted for horizontal sliding movement toward and from each other upon the plane upper surface of a platen 6. The mutually closed positions of the side mold members are determined by the engagement of their plane vertical inner side faces with each other and by the engagement of the contoured walls of the side mold members 2, 4 with the complementally contoured edge face of a bottom mold member 8. To provide for the transfer of the side mold members between their open positions illustrated in FIG. 1 and their closed positions as indicated in FIGS. 4 and 5, the opposite end portions of the mold members are secured to sliding plates 10 mounted for rectilinear movement widthwise of the mold assembly. To provide for the location of the side mold members 2, 4 widthwise relatively to the slides 10, abutment plates 12 extend from front to back of the mold assembly. Each abutment plate 12 is attached to front and back sliding plates 10.

Still referring to FIG. 1, the side mold members 2, 4 are advanced into their mutually closed position by the concomitant operation of two pneumatic pistons (not shown) which operate in cylinders. At its forward extremity each piston rod carries a yoke 14 within which there is pivotally mounted an arm 16 fulcrumed on a pin 18 mounted in the abutment plate 12. Also fulcrumed on the abutment plate 12 is an arm 20 corresponding to the arm 16 and arranged parallel thereto, the two arms being interconnected at their outboard ends by an expansible link 22. Each of the arms 16 and 20 carries a cam roll 24 which acts against a fixed cam plate 26 during forward movement of the arms 16 and 20 thereby to advance the side mold members concomitantly into their mold closing positions. For further details regarding the operation of the mold members, reference may be made to the hereinbefore mentioned patent application.

Referring to FIGS. 2–5, it may be seen that the bottom mold member 8 is characterized by a beveled margin 28 around its molding surface. A rubber gasket 30, triangular in cross section, is cement attached to the beveled surface. During a mold charging operation the gasket 30, under the pressure of the charge in the mold cavity, is pressed against the inner walls of the side mold members, thus sealing the bottom of the mold cavity and preventing the occurrence of flash in the molded sole.

To prevent the occurrence of spew in the canvas upper each side mold member is provided with a flexible metal bite plate 32, secured to the side mold member by screws 34 which also retain a holddown plate 36. Cemented to the bite plate 32 and the side mold member, is a rubber sealing member 40. As may be seen in FIGS. 4 and 5, the sealing member 40 acts along the line of contact of the bite plate with a shoe S to prevent the outflow of fluid from the mold cavity between the bite plate and the shoe.

Figure 2:
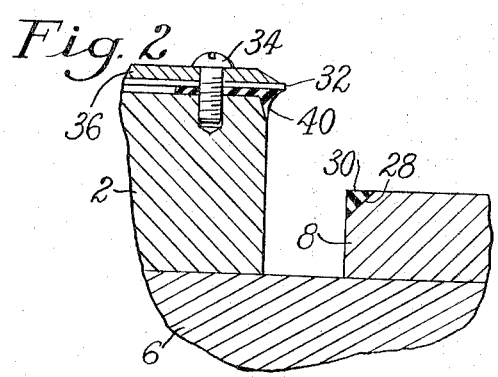
FIGS. 2 and 3 are elevational views taken in section along line II—II of FIG. 1 but showing different embodiments of the bite plate arrangement.
Figure 3:
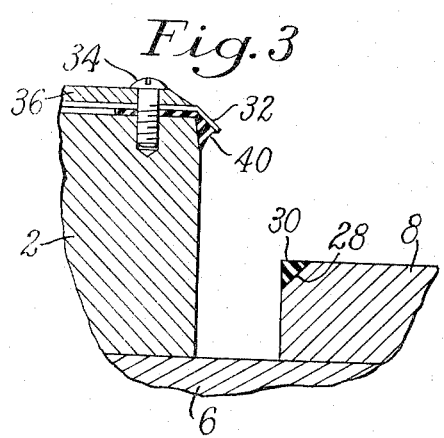

The configuration of the sealing member 40 will vary according to the type of shoe being soled, FIGS. 2 and 3 showing two different designs of sealing members and FIGS. 4 and 5 respectively showing the types of heel and sole units formed by the use of those sealing members.

In operation a shoe upper is placed upon a footform in preparation for soling. The side mold members are moved to a closed position as described above. The footform and shoe are then moved into position to close the mold cavity formed by the bottom and side mold members. An injection material, such as fluid rubber, is then injected into the mold closure until the entire closure is filled. The pressure of the charging causes the gasket 30 to be urged against the inside walls of the side mold members 2, 4, sealing off the bottom of the mold cavity. The pressure of the charging also causes an upward urging of the bite plate 32 and sealing member 40. However, this only serves to urge the bite plate more firmly against the shoe and also to displace a portion of the sealing member 40 to enter the area between the shoe and the edge of the bite plate, thereby preventing the escape of rubber between the bite plate and the shoe. Thus, both spew and flash are eliminated from the molded sole. Accordingly, the top line of the sole presents a pleasing appearance and the usual flash trimming operation can be eliminated altogether.

Since certain obvious changes may be made in the illustrated device without departing from the scope of the invention, it is intended that all matters contained herein be interpreted in an illustrative and not a limiting sense.

Having thus described my invention, what I claim as new and desire to secure by Letters Patent of the United States is:

1. In a mold assembly, a bottom mold member and a plurality of side mold members which in their closed positions provide the peripheral wall of a mold cavity, a portion of said bottom mold member being cut away along its margin to provide a base, and an endless gasket adhered to said base and arranged to be engaged by the side mold members as they come to the limit of their mold closing movement, said gasket having a cross section which corresponds substantially to a cross section of that portion of the bottom mold member which was cut away.

2. In a mold assembly, a plurality of mold members which in their closed positions provide a mold cavity, a portion of a first mold member being cut away to provide a base, the base extending from a point on the wall of the mold cavity to a point on a surface of said first mold member which in the closed position engages at least one opposed surface of at least one other mold member, and a resilient gasket adhered to said base, said gasket having a cross section corresponding substantially to a cross section of that portion of the first mold member which was cut away, said gasket having one side flush with the wall of said mold cavity and a second side flush with said surface of said first mold member.

3. A mold assembly for use in a machine for molding soles in situ onto shoe bottoms wherein said assembly comprises a bottom mold member having the peripheral contour of a shoe sole and a plurality of side mold members having edge faces shaped complementally to the edge face of the bottom mold member so that in their mutually closed position said side mold members are in continuous contiguous relation to the bottom mold member, each side mold member having attached thereto a bite plate which lies in contiguous relation to a lasted shoe mounted in the machine and arranged to provide a closure for the cavity provided by the bottom mold member and the side mold members, said side mold members each being characterized by a sealing member which acts along the line of contact of the bite plate with the shoe to prevent outflow of fluid from the mold cavity between the bite plate and the shoe.

4. A mold assembly for use in a machine for molding soles in situ onto shoe bottoms wherein said assembly comprises a bottom mold member having the peripheral contour of a shoe sole and a pair of side mold members which part on a plane common to a longitudinal median line of the bottom mold member, each side mold member having attached thereto a bite plate which lies in contiguous relation to a lasted shoe mounted in the machine and arranged to provide a closure for the cavity provided by the bottom mold member and the side mold members, each of said side mold members being characterized by a resilient sealing member adhered to the inner surfaces of the side mold member and the bite plate, said sealing member acting in response to the pressure thereagainst of a charge in the mold cavity to enter and seal any spaces existing between the bite plate and the shoe, thus to prevent any outflow of fluid between the bite plate and the shoe during the mold charging operation.

5. A mold assembly for use in a machine for molding soles in situ onto shoe bottoms wherein the mold assembly comprises a bottom mold member having the peripheral contour of a shoe sole and a pair of side mold members which part on a plane common to a longitudinal median line of the bottom mold member, each side mold member having attached thereto a bite plate which lies in contiguous relation to a lasted shoe supported in the mold charging station when the mold cavity is closed, said bite plate being characterized by an inner margin presenting an inclined surface to the shoe and being characterized further by the fact that the bite plate is a resilient structure permitting yielding of the inner margin and consequent pressure of the bite plate against the shoe.

6. A mold assembly for use in a machine for molding soles in situ onto shoe bottoms wherein the mold assembly comprises a bottom mold member having the peripheral contour of a shoe sole and a pair of side mold members which part on a plane common to a longitudinal median line of the bottom mold member, each side mold member having attached thereto a bite plate which, when the mold cavity is closed lies in contiguous relation to a lasted shoe supported in the mold charging station, said side mold members each being characterized by a sealing member which acts to prevent outflow of fluid from the mold cavity between the bite plate and the shoe, and an endless resilient gasket adhered within a continuous marginal recess in the bottom mold member and forming in conjunction with said bottom mold member a continuous unbroken base of the mold cavity.

7. A mold assembly for use in a machine for molding soles in situ onto shoe bottoms wherein the mold assembly comprises a bottom mold member having the peripheral contour of a shoe sole and a pair of side mold members which part on a plane common to a longitudinal median line of the bottom mold member, each side mold member having attached thereto a bite plate which when the mold cavity is closed lies in contiguous relation to a lasted shoe supported in the mold charging station, said side mold members each being characterized by a sealing member which acts to prevent outflow of fluid from the mold cavity between the bite plate and the shoe, and an endless resilient gasket adhered within a continuous marginal recess in the bottom mold member and forming in conjunction with said bottom mold member a continuous unbroken base of the mold cavity, said gasket also forming with the edge face of the bottom mold member a continuous unbroken peripheral surface thereof characterized by a smooth, flush junction between the gasket and the edge face of the bottom mold member.

References Cited by the Examiner

UNITED STATES PATENTS

| | | | |
|---|---|---|---|
| 2,045,705 | 6/1936 | Finn | 18—17 |
| 2,495,100 | 1/1950 | Henderson | 25—121 |
| 2,922,191 | 1/1960 | Burton | 18—17 |

FOREIGN PATENTS 889,522   2/1962   Great Britain.

J. SPENCER OVERHOLSER, *Primary Examiner.*

J. HOWARD FLINT, JR., *Examiner.*